United States Patent
Liu

(10) Patent No.: US 12,308,989 B1
(45) Date of Patent: May 20, 2025

(54) OPTIMIZED VIDEO CALL GRID FOR PICTURE-IN-PICTURE MODE

(71) Applicant: Meta Platforms, Inc., Menlo Park, CA (US)

(72) Inventor: Shenwei Liu, Bellevue, WA (US)

(73) Assignee: Meta Platforms, Inc., Menlo Park, CA (US)

( * ) Notice: Subject to any disclaimer, the term of this patent is extended or adjusted under 35 U.S.C. 154(b) by 157 days.

(21) Appl. No.: 18/099,164

(22) Filed: Jan. 19, 2023

(51) Int. Cl.
  *H04N 7/15* (2006.01)
  *H04L 12/18* (2006.01)
  *H04N 21/4402* (2011.01)
  *H04N 21/4788* (2011.01)

(52) U.S. Cl.
  CPC ........... *H04L 12/1822* (2013.01); *H04N 7/15* (2013.01); *H04N 21/440272* (2013.01); *H04N 21/4788* (2013.01)

(58) Field of Classification Search
  CPC .... G06V 40/178; G06V 20/41; G06V 40/103; H04L 12/1822; H04L 12/1827; H04L 65/1076; H04L 65/403; H04L 65/80; H04L 12/1831; H04L 65/1083; H04L 65/1096; H04L 65/4038; H04M 3/567; H04N 7/15; H04N 7/155; H04N 7/157; H04N 21/42203; H04N 21/440272; H04N 21/4532; H04N 21/4788; H04N 7/0135; H04N 7/141; H04N 7/144; H04N 7/152; G01S 17/88; G06F 3/0482; G06F 18/28; G06T 11/001; G11B 27/036
  See application file for complete search history.

(56) References Cited

U.S. PATENT DOCUMENTS

| | | | | |
|---|---|---|---|---|
| 8,749,612 B1* | 6/2014 | Ellner | ....................... | H04N 7/15 348/14.09 |
| 8,976,220 B2* | 3/2015 | Maxwell | ................... | H04N 7/15 375/240.09 |
| 2006/0182311 A1* | 8/2006 | Lev | ......................... | G06F 18/28 382/254 |
| 2010/0271457 A1* | 10/2010 | Thapa | ............... | H04N 21/42203 348/E7.083 |
| 2012/0176466 A1* | 7/2012 | Wrench | ............... | H04L 65/1076 348/E7.083 |
| 2012/0224021 A1* | 9/2012 | Begeja | .................... | H04N 7/155 348/E7.083 |
| 2012/0306993 A1* | 12/2012 | Sellers-Blais | ........... | H04L 65/80 348/14.08 |
| 2013/0120522 A1* | 5/2013 | Lian | ........................ | H04N 7/15 348/E7.083 |
| 2013/0147904 A1* | 6/2013 | Vivekanandan | .... | H04L 12/1827 348/E7.083 |
| 2014/0028785 A1* | 1/2014 | Valentine | ............ | H04L 12/1822 348/E7.083 |
| 2014/0253671 A1* | 9/2014 | Bentley | ............... | H04L 12/1831 348/14.08 |

(Continued)

*Primary Examiner* — Gerald Gauthier
(74) *Attorney, Agent, or Firm* — Eversheds Sutherland (US) LLP

(57) ABSTRACT

Systems, methods, and non-transitory computer readable media are configured to perform operations comprising determining a ranking of users participating in a video call; determining a selected number of videos to be included in a grid of videos associated with the video call based on the ranking; and generating the grid of videos based on a combination of the selected number of videos.

20 Claims, 18 Drawing Sheets

(56) References Cited

U.S. PATENT DOCUMENTS

| | | | | |
|---|---|---|---|---|
| 2014/0320591 A1* | 10/2014 | Baron, Jr. | ............... | H04N 7/15 348/14.08 |
| 2015/0022625 A1* | 1/2015 | Thapa | ............... | H04L 65/4038 348/14.08 |
| 2015/0097922 A1* | 4/2015 | Le Devehat | ......... | H04M 3/567 348/14.08 |
| 2015/0334313 A1* | 11/2015 | Chougle | ............... | H04N 7/15 348/14.07 |
| 2016/0057389 A1* | 2/2016 | Johnson | ............ | H04N 21/4532 348/14.08 |
| 2016/0150184 A1* | 5/2016 | Gandhi | ............... | H04N 7/15 348/14.08 |
| 2016/0205347 A1* | 7/2016 | Chen | ............ | H04N 7/141 348/14.08 |
| 2016/0246452 A1* | 8/2016 | Bockhold | ............ | G06F 3/0482 |
| 2016/0255126 A1* | 9/2016 | Sarris | ............... | H04L 65/1096 348/14.08 |
| 2018/0176508 A1* | 6/2018 | Pell | ............ | H04L 65/403 |
| 2019/0238600 A1* | 8/2019 | Cavalcanti Alem | ............ | H04L 65/1083 |
| 2020/0226896 A1* | 7/2020 | Robertson | ............ | G06V 40/103 |
| 2020/0389506 A1* | 12/2020 | Rakshit | ............ | H04N 7/15 |
| 2021/0076002 A1* | 3/2021 | Peters | ............ | H04N 7/152 |
| 2021/0176429 A1* | 6/2021 | Peters | ............ | G06V 20/41 |
| 2021/0185276 A1* | 6/2021 | Peters | ............ | G06V 20/41 |
| 2022/0157342 A1* | 5/2022 | Kliushkin | ............ | G11B 27/036 |
| 2022/0247975 A1* | 8/2022 | Lanier | ............ | H04L 12/1822 |
| 2022/0400228 A1* | 12/2022 | Sommerlade | ............ | H04N 7/144 |
| 2023/0071584 A1* | 3/2023 | Lebeau | ............ | H04N 7/157 |
| 2023/0135312 A1* | 5/2023 | Decrop | ............ | G01S 17/88 348/14.08 |
| 2023/0138733 A1* | 5/2023 | Springer | ............ | H04N 7/0135 348/14.08 |
| 2023/0164298 A1* | 5/2023 | Khot | ............ | H04N 7/15 348/14.08 |
| 2023/0261892 A1* | 8/2023 | Xue | ............ | H04N 7/15 348/14.08 |
| 2023/0300292 A1* | 9/2023 | Barbosa da Silva | ............ | H04L 12/1827 348/14.07 |
| 2023/0360282 A1* | 11/2023 | Blackburne | ............ | H04N 7/157 |
| 2023/0368444 A1* | 11/2023 | Blackburne | ............ | G06T 11/001 |
| 2024/0048668 A1* | 2/2024 | Lee | ............ | H04N 7/157 |
| 2024/0214232 A1* | 6/2024 | Reszka | ............ | G06V 40/178 |

* cited by examiner

402a

402b

402c

402d

402e

402f

OPTIMIZED VIDEO CALL GRID FOR PICTURE-IN-PICTURE MODE

FIELD OF THE INVENTION

The present technology relates to the field of digital communications. More particularly, the present technology relates to video call grids.

BACKGROUND

People can utilize computing devices for a wide variety of purposes. For example, users can utilize computing devices to access a communications platform or a content sharing platform (e.g., social networking system). Through a suitable platform, the users can utilize the computing devices to interact and communicate with one another in a variety of manners. For example, the computing devices can run an application that supports video calling among different users.

SUMMARY

Various embodiments of the present technology can include systems, methods, and non-transitory computer readable media configured to perform operations comprising determining a ranking of users participating in a video call; determining a selected number of videos to be included in a grid of videos associated with the video call based on the ranking; and generating the grid of videos based on a combination of the selected number of videos.

In some embodiments, the grid of videos is rendered in a picture-in-picture mode through a screen of a computing device of a user participating in the video call.

In some embodiments, an aspect ratio of the grid of videos is variable during the video call based on orientations of the selected number of videos.

In some embodiments, the grid of videos associated with the video call has a first aspect ratio and a grid of videos associated with a second video call has a second aspect ratio.

In some embodiments, each video of the selected number of videos is not cropped in the grid of videos.

In some embodiments, the ranking of users is based on a prioritization of configuration information associated with the users.

In some embodiments, the configuration information comprises at least one of: selection by a user of a setting to display a video of the user in the grid or a predetermined action taken by a user during the video call.

In some embodiments, the predetermined action comprises at least one of: screen sharing or speaking.

In some embodiments, the selected number is based on at least one of: resource expenditures, size of a user depicted in a video in the grid of videos, awareness of a user about itself, or awareness of a user about all users in the video call.

In some embodiments, the grid of videos contains a number of videos that is less than the selected number of videos when resource availability satisfies a threshold value.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the present technology.

Figure 1A:
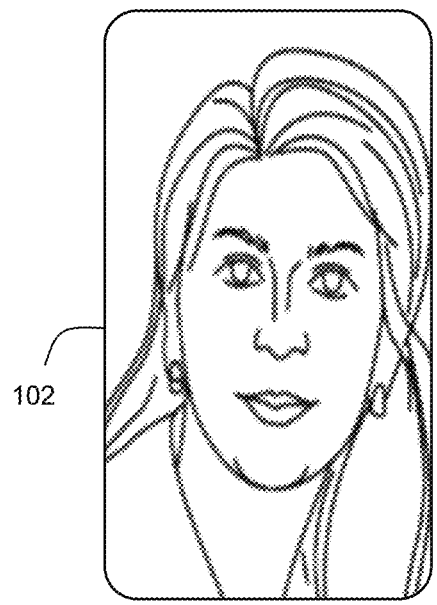
FIGS. 1A-1B illustrate a video calling technique.
Figure 1A:
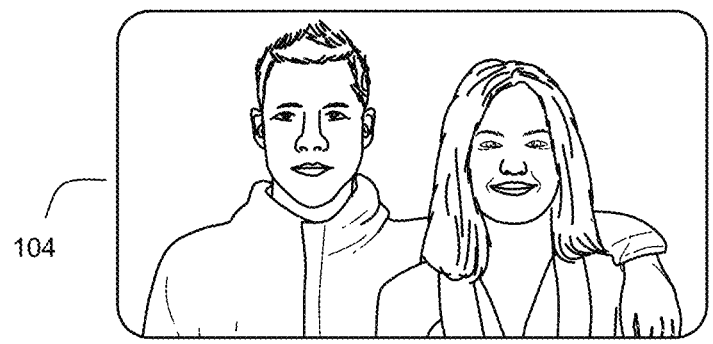

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the present technology described herein.

DETAILED DESCRIPTION

People can utilize computing devices for a wide variety of purposes. For example, users can utilize computing devices to access a communications platform or a content sharing platform (e.g., social networking system). Through a suitable platform, the users can utilize the computing devices to interact and communicate with one another in a variety of manners. For example, the computing devices can run an application that supports video calling among different users.

A video call allows different users to connect and communicate with one another in real time. Typically, users can participate in a video call through an application installed on a computing device and associated with a communications platform supporting the video call. Utilizing the application and a camera, each user can be captured in a video stream as the user participates in the video call. The video streams of different users can be processed and combined in some manner by the communications platform and, in turn, each user can be provided through the application a video stream that is representative of the video call. The video stream provided to each user can contain one or more of the individual video streams capturing each user as they participate in the video call.

Users often participate in a video call through use of a mobile computing device on which the application is running. A mobile computing device typically captures video of a user that is configured in a portrait (or vertical) view or a landscape (or horizontal) view, depending on the orientation of the mobile computing device as it is capturing the video. Different videos of users in a video call can be combined together and provided to the users as a representation of the video call. When the application is foregrounded on a computing device of a user in a video call, the application can display the representation of the video call in full screen mode to the user.

In certain circumstances, the user may choose to background the application or otherwise dismiss the application for non-primary usage on the computing device. For example, the user may wish to use a different application on the computing device while, at the same time, continuing the video call. For instance, the user may wish to play a video game, view a calendar, or check email messages through an application other than the application supporting the video call. In this example, the user may provide a command to the computing device to cause backgrounding of the application supporting the video call. As a result, display of the representation of the video call through a screen of the computing device can be reduced in prominence. For example, the representation of the video call can be reduced in size and positioned to occupy a corner of the screen so that the representation of the video call "floats" on top of a portion of the other application. Such a configuration in which a representation of a video call is overlaid on a portion of a different application can be referred to as a picture-in-picture (PIP) mode.

A representation of a video call in a picture-in-picture mode can be a grid of videos of users in the video call. The grid of videos can be a particular combination or a stitching together of individual videos (or source videos) of the users. For example, the videos of the users can be stacked one-on-top-of-the-other, side-by-side, or both. In conventional techniques, the grid of videos is presented with a fixed aspect ratio in a relatively small space on the screen of a computing device. Because of the fixed aspect ratio of the grid of videos, the individual videos when combined in the grid are often undesirably cut off (or cropped) based on geometric constraints resulting from the fixed aspect ratio.

Figure 1B:
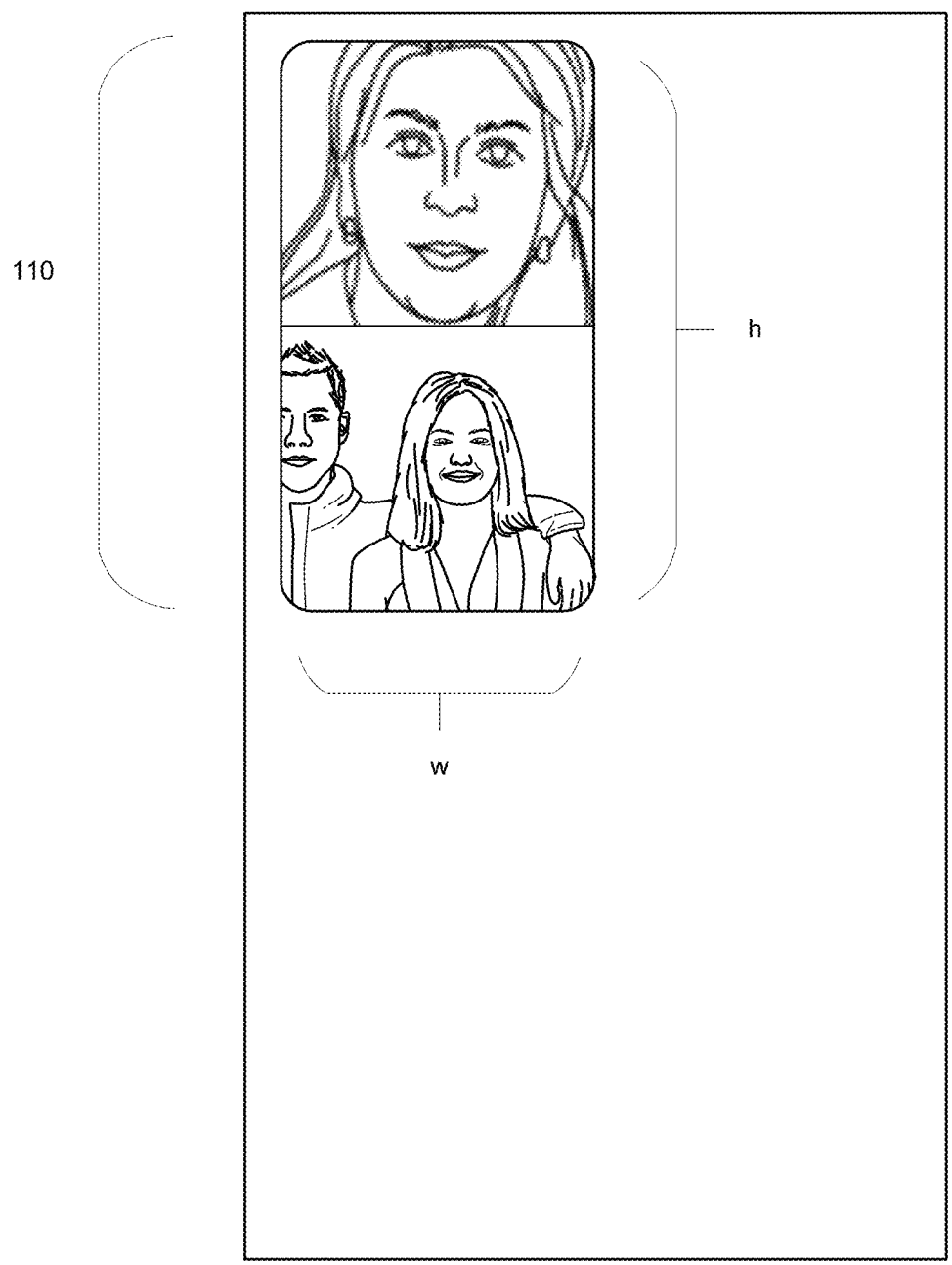

FIG. 1A shows a first video (video stream) 102 captured by a computing device of a first user and a second video (video stream) 104 captured by a computing device of a second user. The first user and the second user (along with a third user as depicted) are engaged in a video call according to conventional techniques. As shown, the first video 102 is being captured in a portrait view and the second video 104 is being captured in a landscape view. FIG. 1B shows a combination of the first video 102 and the second video 104 that constitutes a conventional representation of the video call in a picture-in-picture mode. The representation of the video call in the picture-in-picture mode is a grid 110 of the first video 102 and the second video 104 that is displayed through screens of the computing devices of the first user and the second user. According to conventional techniques, the dimensions of the grid 110 are constrained by a fixed aspect ratio that is represented by a w value and an h value. Accordingly, as shown, the subject matter captured in the first video 102 is undesirably cut off. Likewise, the subject matter captured in the second video 104 also is cut off. The subject matter in the first video 102 and the second video 104 are cut off because the first video 102 and the second video 104 cannot be geometrically combined in their entireties when subject to the fixed aspect ratio. Thus, under conventional techniques, subject matter intended to be shared through a video call is often not faithfully depicted in the video call, thus frustrating the intent of users in the video call and sacrificing video call quality.

Conventional techniques suffer from other disadvantages. Under conventional techniques, the number of videos of users included in a grid is often suboptimal. For example, too many videos of users are often included in the grid. As a result, the visibility of each depicted user in a respective video of the grid can be poor. Further, computer resources required to process a large number of videos to generate the grid can be cost prohibitive. As another example, a grid can sometimes contain too few videos of users in the video call. When a grid contains an unduly small number of videos, the videos of many users in the video call are excluded, thus comprising awareness about the video call at various levels. A video of a user excluded from the grid may cause the user to lack self-awareness regarding how the user actually appears in the video. Further, a user in the video call may lack awareness about the entirety of users in the video call given the visual absence of some users from the grid.

An improved approach rooted in computer technology overcomes the foregoing and other disadvantages associated with conventional approaches specifically arising in the realm of computer technology. In various embodiments, the present technology can determine configuration information associated with users in a video call. The configuration information can include, for example, the identity, selected settings, or actions of each user in the video call. The configuration information also can include, for example, the orientation of a computing device (e.g., portrait view or landscape view) while video is being captured by the computing device for the video call. The configuration information can include real time data regarding changes to orientations of computing devices capturing video for a video call. For example, the configuration information can reflect movement of a mobile computing device by a user that causes a transition from portrait view to landscape view (or vice versa) during video capture.

Based on a prioritization of the configuration information, videos (or video streams) of a selected number of users can be selected for inclusion in a grid of videos to be displayed as the representation of the video call. The selected number of videos can enable the grid of videos to display an optimal number of users. The grid of videos can be a representation, rendering, or depiction of the video call in a picture-in-picture mode. Based on the configuration information, a geometric layout for a combination of the videos can be generated as the grid of videos. The layout for the grid of videos can have a variable aspect ratio to accommodate various combinations of videos having different and changing orientations. As a result, the layout for the grid of videos can preserve the entirety of the video of each user included in the grid without undesirable cropping of the video. In some instances, display of the grid of videos can be adjusted based on availability of resources, such as network bandwidth and power supply. More details relating to the present technology are provided herein.

Figure 2:
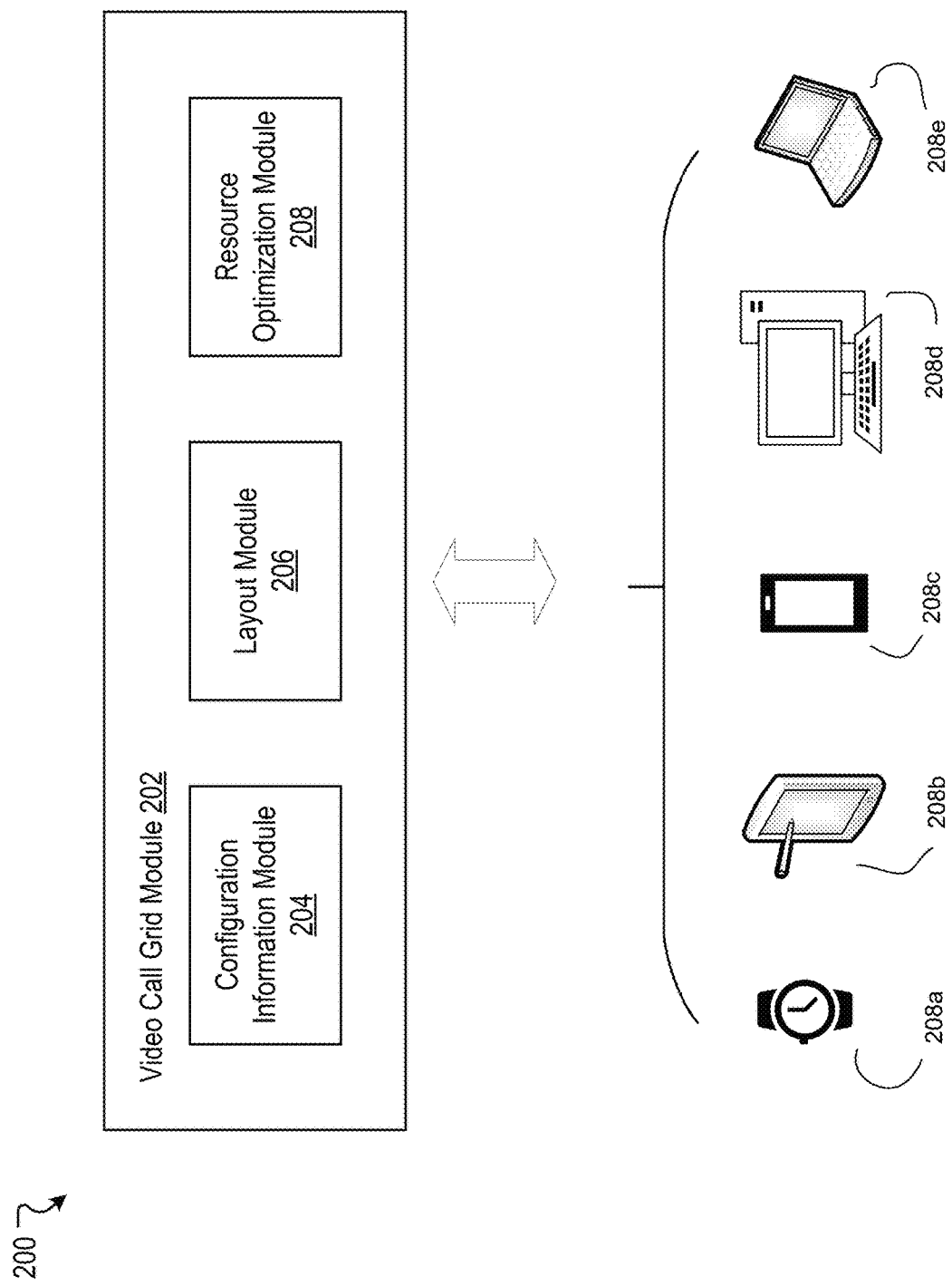
FIG. 2 illustrates an example system including a video call grid module, according to an embodiment of the present technology.

FIG. 2 illustrates an example system 200 including a video call grid module 202, according to an embodiment of the present technology. The video call grid module 202 can support a video call involving any desired number of users. The video call grid module 202 can generate a representation of the video call in a picture-in-picture mode as a grid of videos (or video streams) of one or more users participating in the video call. The video call grid module 202 can generate the grid of videos in a manner such that the videos in the grid are displayed in their entireties without cropping (or removal) of any content from the original source videos captured by the users.

In some embodiments, the system 200, including the video call grid module 202, can be implemented on a server system that is in communication over a communications network with client computing devices 208*a*, 208*b*, 208*c*, 208*d*, 208*e* of various users. In some embodiments, client computing devices 208 can include or be implemented with a user device 620, as discussed in relation to FIG. 6. In some embodiments, some or all of the functionality of the video call grid module 202 can be performed by a server of the system 200. In some embodiments, some or all of the functionality of the video call grid module 202 can be performed by an application running on the client computing devices 208. In some embodiments, the functionality of the video call grid module 202 can be distributed between a server of the system 200 and an application running on the client computing devices 208. The system 200 can be associated with a suitable platform or system. For example, the system 200 can be implemented by a communication platform or system. Although a particular type of platform or system may be referenced in various examples discussed herein, the present technology can apply to any type of communication platform or system, messaging platform or system, social networking platform or system, content sharing platform or system, or the like. In some instances, the system 200 can include at least one data store (not shown) in communication with the video call grid module 202. The data store can maintain information required to support operation of the system 200 and the video call grid module 202. For example, the data store can maintain videos of users in a video call, configuration information associated with the users, a prioritization of configuration information, rankings of the users, grid layouts for different combinations of videos having different orientations, and other data supportive of operation of the video call grid module 202.

The client computing devices 208a, 208b, 208c, 208d, 208e can be, for example, any combination of mobile devices and non-mobile devices, such as smart-phones, tablets, laptops, watches, desktop computers, etc. Each of the client computing devices 208 can be associated with a user and allow the user to participate in a video call with other users. Each of the client computing devices 208a, 208b, 208c, 208d, 208e can include one or more applications running on the client computing device 208 and having functionality to support or enable video calling. An application on the client computing devices 208 can include an interface that is presented through a screen of the client computing device 208. The interface can allow the user associated with the client computing device 208 to capture real time video of the user for potential inclusion in a representation of the video call that can be displayed to users in the video call. The interface can display the representation of a video call as a combination of videos of a selected number of users participating in the video call. In some embodiments, the representation of the video call can be displayed in a picture-in-picture mode as a grid of videos overlaid on a portion of a full screen presentation of a different application unrelated to the video call. A user of the client computing device 208 can interact with the application enabling video calling through appropriate inputs and commands (e.g., touch gestures) applied to the screen through which the interface of the application is presented.

The video call grid module 202 can include a configuration information module 204, a layout module 206, and a resource optimization module 208. The components (e.g., modules, elements, etc.) shown in this figure and all figures herein are exemplary only, and other implementations may include additional, fewer, integrated, or different components. Some components may not be shown so as not to obscure relevant details. In various embodiments, one or more of the functionalities described in connection with the video call grid module 202 can be implemented in any suitable combinations.

The configuration information module 204 can determine various types of configuration information to support configuration and generation of an optimal grid of videos as a representation of a video call. The grid of videos can contain videos of some or all users participating in the video call. The grid of videos can be provided for presentation to a user participating in the video call. Configuration information can include, for example, any types of relevant profile information, status information, and contextual information about a video call or users participating in the video call that can support the generation of a grid of videos to represent the video call.

Configuration information can include information regarding users who are to participate in a video call. Such information can include the identity of a user captured in a video. For example, a stream of a video capturing the user can be associated with the identity of the user. Further, such information can include a role of a user in the video call. The role of a user may include, for example, an administrator of the video call, an organizer of the video call, a manager of users in the video call, a special guest for the video call, an invitee to the video call, etc.

Configuration information can include information regarding features of computing devices capturing video of users for a video call. For example, such information can include whether a user is using a mobile computing device for the video call. Further, such information can include dimensions of a screen of the computing device of each user. For example, many conventional mobile computing devices have screens with rectangular dimensions. For instance, common dimensions for screens of mobile computing devices are 9×16 or 16×9.

Configuration information can include information regarding settings selected by users. Such information can include one or more settings selected by a user for a video call. The application running on the computing device of the user can provide settings for a user to personalize features and functionality relating to the video call. For example, one setting can relate to whether a video capturing the user during the video call is to be presented to the user itself. When the setting is selected, the user can see a real time video of the user as the user participates in the video call.

Configuration information can include information regarding actions taken by users. Such information can include various actions taken by users during a video call. For example, such information can reflect whether a user in the video call is currently screen sharing with other users in the video call. Screen sharing can be performed when a user wishes to present information to other users in the video call. For instance, if a user determines that a document accessible on the computing device of the user would be appropriately displayed for other users in the video call, the user can provide a command to stream video of the document for display to the other users. As another example, such information can indicate whether a user in a video call is currently speaking in the video call. Any suitable conventional technique can be applied to a video stream to determine whether a user depicted in the video stream is currently speaking. For instance, machine learning based techniques can analyze audio data in a video stream and other features to infer the occurrence of speaking. As yet another example, such information can identify a user in a video call who spoke immediately before a current speaker in the video call. In this regard, speaking by users in the video call can be identified and associated with time stamps reflecting the time durations when the speaking occurred. Based on the time stamps, a user who spoke immediately prior to a user is who is currently speaking can be identified. Many variations are possible.

The configuration information can include orientation information. Orientation information can describe in real time (or near real time) the orientation of a computing device of a user that is capturing video for a video call. Orientation of a mobile computing device potentially can change during a video call and between separate video calls. For example, a mobile computing device capturing video of a user for a video call can be oriented in a portrait (or vertical) view during a first time duration of the video call and in a landscape (or horizontal) view during a second time duration of the video call. As another example, a mobile computing device capturing video of a user for a video call can be oriented in a landscape (or horizontal) view during a first time duration of the video call, in a portrait (or vertical) view during a second time duration of the video call, and in a landscape (or horizontal) view during a third time duration of the video call. In general, during a video call, a mobile computing device capturing video of a user can transition any number of times between or among different orientations, depending on control of the mobile computing device by the user. The configuration information can include real time tracking of the orientation of a computing device of each user during a video call.

The foregoing examples of configuration information are provided for purposes of illustration. Other types of configuration information to support generation of a grid of videos to represent a video call are possible. Further, different combinations of configuration information can be utilized in different implementations. Many variations are possible.

The layout module 206 can select videos of users participating in a video call for inclusion in a grid of videos that represents the video call. The videos can be selected based on various types of configuration information associated with the users in the video call. Users in a video call can be prioritized or ordered in a ranking for potential inclusion in a grid of videos based on their associated configuration information. In this regard, different types of configuration information can be prioritized to determine which users in a video call are to be included in the grid of videos. Users can be accordingly prioritized or ranked based on their association with the prioritized configuration information. In some embodiments, grids of videos to be presented to all users in a video call can contain the same videos except that each grid may be unique by including a video (or self video) of the user to whom the grid is being presented.

In one implementation, a particular prioritization of certain configuration information for a ranking of users can be selected. Based on the particular prioritization of certain configuration information, a highest ranked user can be a user who selected a setting to display the user itself during the video call; the second highest ranked user can be a user who is screen sharing with other users in the video call; the third highest ranked user can be a user who is currently speaking during the video call; and, the fourth highest ranked user can be a user who spoke immediately before the user who is currently speaking. Many variations are possible. For example, in variations of the implementation just described, the prioritization of certain configuration information can specify, based on different types of configuration information, a fifth highest ranked user, a sixth highest ranked user, a seventh highest ranked user, and so on. The users in a video call can be ordered in a ranking for inclusion in a grid of videos based on any desired prioritization of different types of configuration information.

The layout module 206 can periodically perform a ranking of users in a video call. The position of users in the ranking can change during the course of a video call based on changing configuration information applicable to the users. For example, during a video call, one user may be currently speaking but in the future cease speaking when another user begins speaking. As another example, a user may be passively participating in a video call until the user begins to screen share with other users. Based on dynamic conditions during a video call, the layout module 206 can repeatedly update a ranking of the users during the video call. For example, the updating of the ranking can be performed at a selected frequency rate or can be performed when a change in configuration information associated with users in the video call is detected. Many variations are possible.

The layout module 206 can determine a selected number of videos of users in a video call to be included in a grid of videos. The selected number of videos to be included in a grid of videos can be determined based on a variety of criteria or considerations. The selected number of videos to be included in a grid of videos can be determined experimentally or heuristically. For example, the selected number of videos should not be so large in value as to cause each user in a video of the grid to appear unduly small (e.g., the depicted size of each user satisfies a size threshold). As another example, the selected number of videos should not be so large in value as to require expenditure of an undue amount of system resources to generate the grid (e.g., system resource expenditure satisfies an expenditure threshold). As yet another example, the selected number of videos should not be so small in value as to preclude an undue number of users in a video call from seeing themselves in the grid (e.g., the number of users excluded from the grid satisfies a first threshold number of users). As a further example, the selected number of videos should not be so small in value as to preclude a user in a video call from being aware of a suitable portion of all users participating in the video call (e.g., the number of users excluded from the grid satisfies a second threshold number of users). The selected number of videos to be included in a grid also can be based on dimensions of screens of computing devices of the users in a video call. In some embodiments, the selected number of videos can be a value of three (3). In some embodiments, the selected number of videos can be a value other than three. For example, when screens of computing devices of users in a video call have relatively large dimensions (e.g., dimensions larger than a dimension threshold), more videos can be comfortably included in a grid of videos and accordingly the selected number of videos can be a relatively larger number. Many variations are possible.

The videos to be included in a grid of videos can be the videos of the selected number of highest ranked users from a ranking of users in a video call. For example, if the selected number of videos to be included in the grid is three, the three highest ranked users in the ranking of users can be selected for inclusion in the grid of videos. As another example, if the selected number of videos to be included in the grid is four, the four highest ranked users in the ranking of users can be selected for inclusion in the grid of videos. As discussed, the position of users in a ranking can change as conditions and certain configuration information associated with a video call change. Accordingly, the videos of users to be included in a grid of videos can change even as the total number of videos in the grid remains the selected number of videos. For example, assume a video call in which user1, user2, user3, user4, user5, user6, and user7 are participating. When the selected number of users to be included in a grid of videos is three in this example, the grid may contain videos of user1, user 3, and user4 at a first duration of time. Given changing configuration information applicable to the users, the grid may later contain videos of user1, user6, and user7 at a second duration of time.

The layout module 206 can generate a geometric layout for a grid of videos based on the selected number of videos to be included in the grid. The layout module 206 can determine orientation of each video to be included in the grid. Based on the orientation of each video (e.g., portrait orientation, landscape orientation), the layout module 206 can combine the videos to be included in the grid so that their combination does not cause cropping or cutting off of subject matter in any of the videos. In generating the grid of videos, the layout module 206 can adjust the size of an individual video while maintaining the aspect ratio of the video, thus preserving the entirety of subject matter depicted in the video without cropping. The layout module 206 can generate a grid of videos by combining or stitching together the individual videos to be included in the grid. The videos to be included in the grid can be stacked one-on-top-of-the-other, side-by-side, or both. The resulting grid can have a non-fixed, or variable, aspect ratio, depending on the orientations of the videos included in the grid. For example, a grid of videos representing a video call can have a first aspect ratio based on the orientations of the videos included in the grid at a first duration of time during the video call. In this example, the grid of videos representing the video call can have a second aspect ratio based on the orientations of the videos included in the grid at a second duration of time during the video call. Likewise, during the video call, the grid of videos can have additional aspect ratios (e.g., third, fourth, etc.) to reflect the combination of videos having different or changing orientations. Different layouts of grids of videos are described below in relation to FIGS. 4A-4K.

The layout module 206 can provide a grid of videos associated with a video call, as well as aspect ratios specified for the grid, to a computing device of a user as a representation of the video call in a picture-in-picture mode. The operating system of the computing device can maintain the aspect ratios of the grid of videos as the grid is rendered. While the computing device may determine a size for the grid of videos based on operating system constraints (or user commands), the aspect ratios of the grid are maintained. Accordingly, the grid of videos faithfully preserves all subject matter depicted in the videos included in the grid without undesirable cropping.

The resource optimization module 208 can modify a grid of videos associated with a video call based on resource constraints. Resource constraints can include, for example, limited power (e.g., battery) of a computing device of a user in a video call or limited network bandwidth over which the computing device communicates with a communication platform enabling the video call. In the event that resource availability has fallen to a threshold level, the resource optimization module 208 can adjust the representation of a video call provided to users in the video call to optimize (or decrease) resource usage. In some embodiments, if an amount of resources available to one or more computing devices of users in a video call has fallen to a threshold level, the resource optimization module 208 can reduce the number of videos to be included in the grid of videos to conserve power consumption by the computing devices. For example, the number of videos included in a grid of videos can be reduced from a selected number of videos (e.g., three) to a number of videos that is less than the selected number (e.g., two, one). In some embodiments, if an amount of resources available to one or more computing devices of users in a video call has fallen to a threshold level, the resource optimization module 208 can cease visual presentation of the grid of videos for a predetermined or suitable amount of time and only provide audio (or audio stream) of the video call to each user in the video call. Other techniques to conserve resources are possible.

Figure 3:
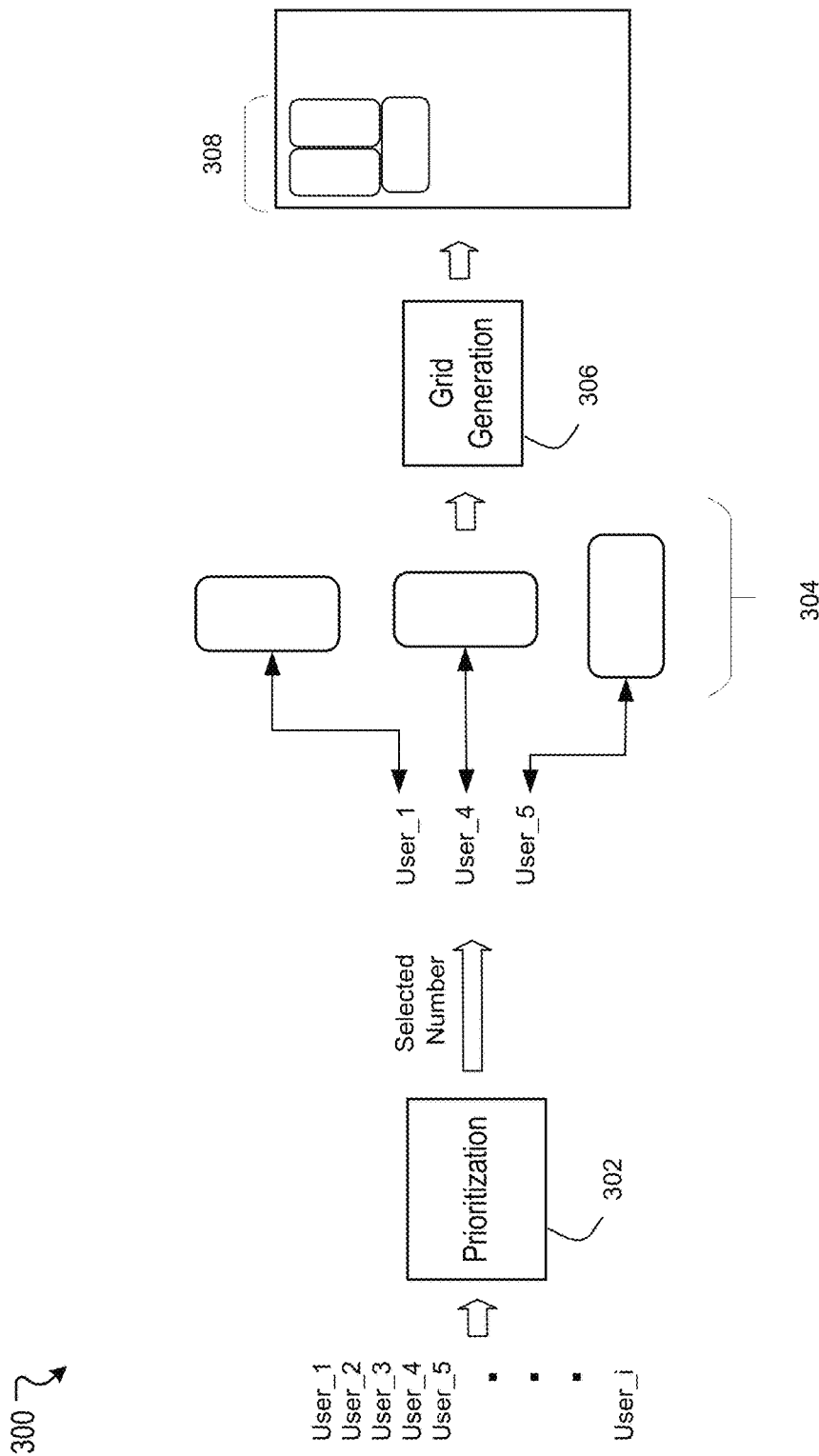
FIG. 3 illustrates an example simplified functional block diagram, according to an embodiment of the present technology.

FIG. 3 illustrates an example simplified functional block diagram 300, according to an embodiment of the present technology. In some embodiments, the functionality of the functional block diagram 300 can be implemented or performed by the video call grid module 202. The functional block diagram 300 illustrates generation of a grid of videos in a picture-in-picture mode for presentation on a screen of a computing device of a user participating in a video call. A plurality of users (e.g., User_1, User_2, User_3, User_4, User_5, . . . , User_i) can be participating in the video call. At 302, the plurality of users can be ordered in a ranking of users based on prioritization of configuration information associated with the users, as discussed herein. A selected number of videos for inclusion in the grid of videos can be applied to the ranking to determine the selected number of highest ranking users. The selected number of videos can be determined based on a variety of considerations, as discussed herein. In one implementation, when the selected number of users to be included in a grid of videos is three, the three highest ranked users can be selected from the ranking (e.g., User_1, User_4, and User_5). Videos (or video streams) 304 of the selected number of users can be obtained. At 306, the videos 304 of the selected number of users can be combined to generate a grid 308 having a layout based on orientations of the videos. The grid 308 can be displayed in a picture-in-picture mode on the screen of the computing device of the user. During the course of a video call, because the orientations of the videos can change, the aspect ratio of the generated grids accordingly change so that the entire content of each video in a grid is preserved without cropping. The functional block diagram 300 is merely a simplified example and many variations are possible.

Figure 4A:
FIG. 4A illustrates example videos to be included in grids representing video calls, according to an embodiment of the present technology.
Figure 4A:
Figure 4A:
Figure 4A:
Figure 4A:
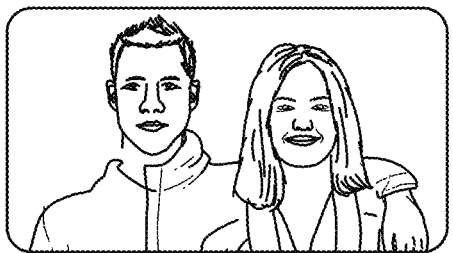
Figure 4A:
Figure 4B:
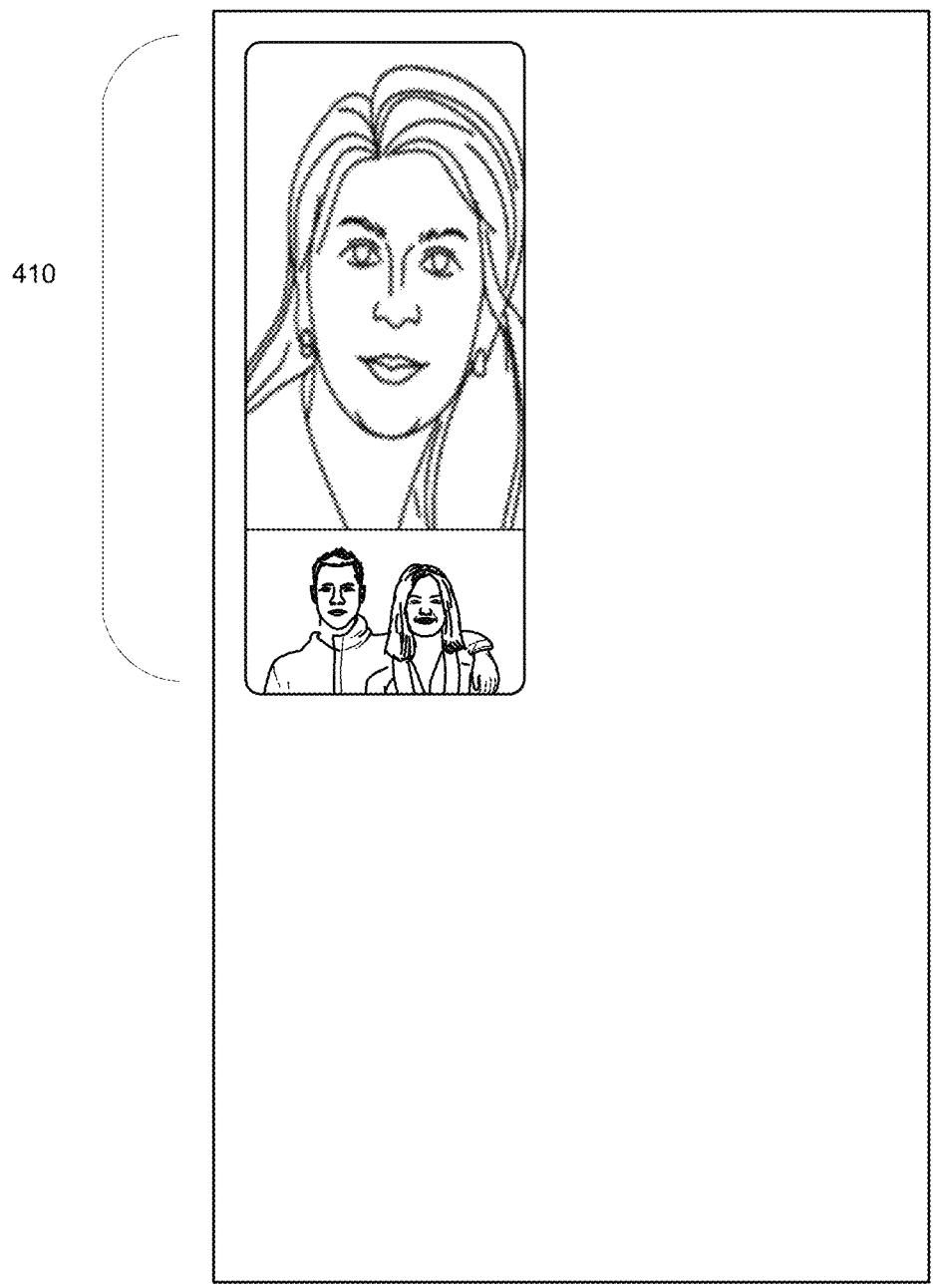
FIGS. 4B-4K illustrate example layouts of grids of videos having different aspect ratios, according to an embodiment of the present technology.
Figure 4C:
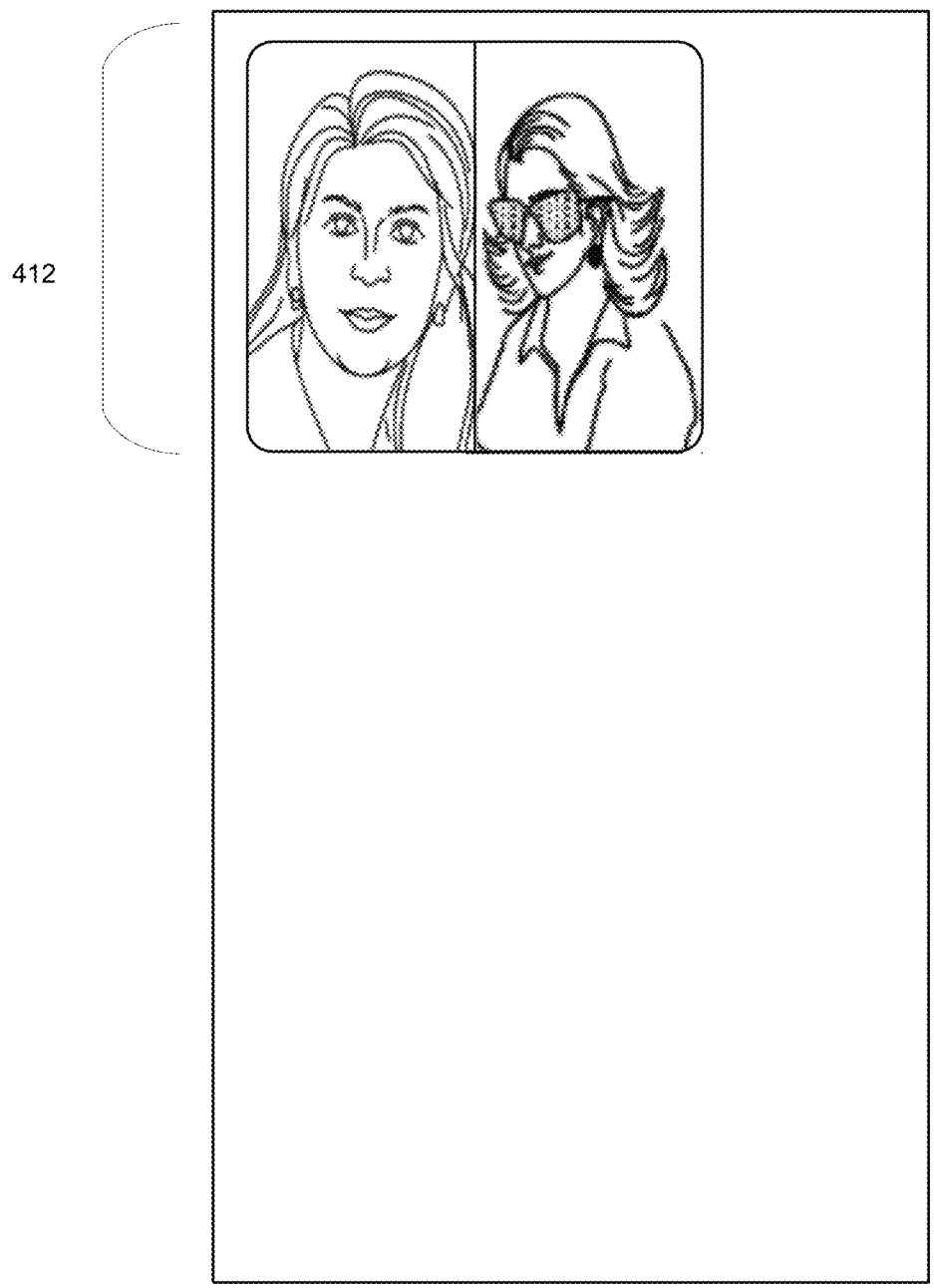
Figure 4D:
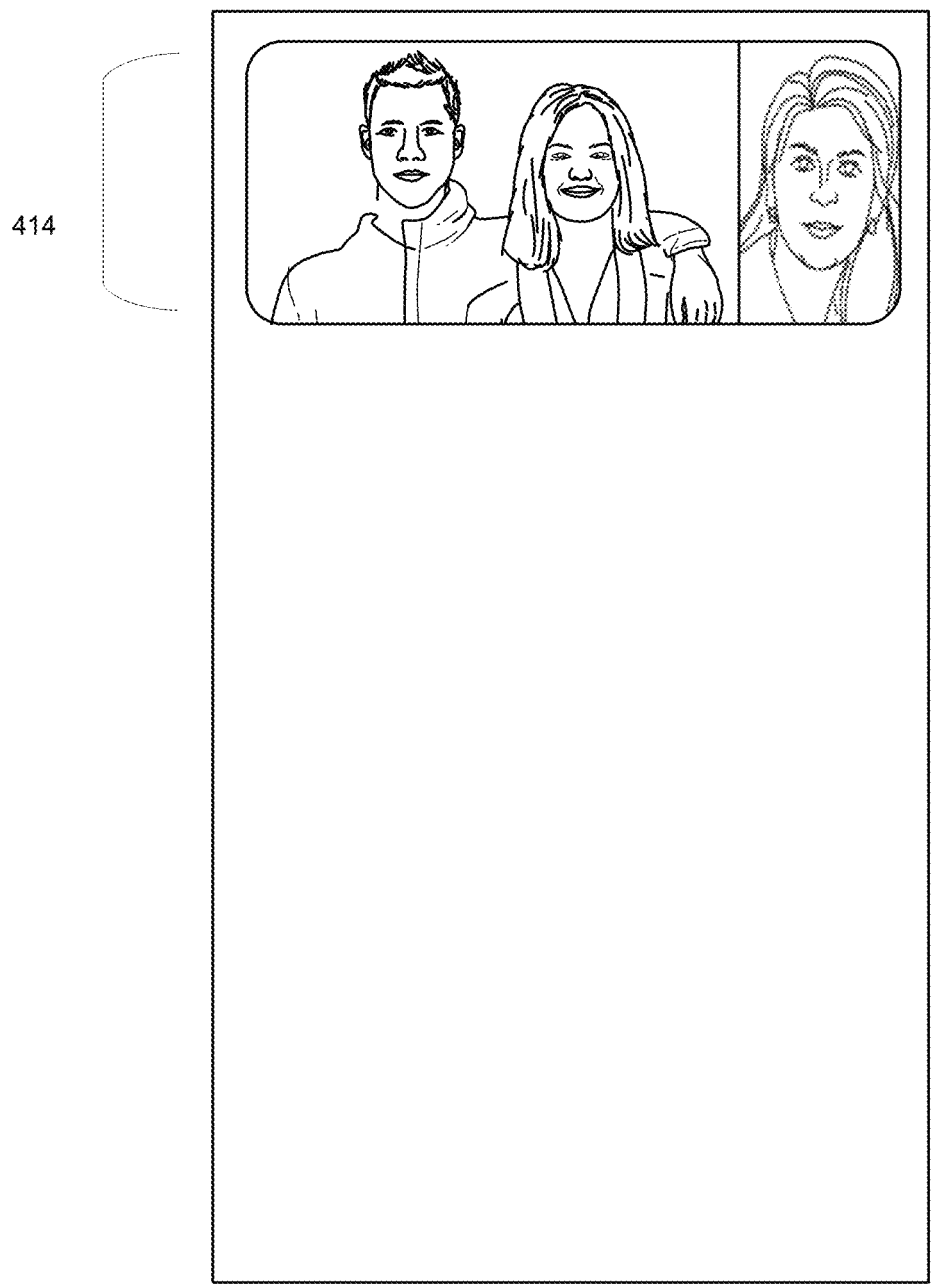
Figure 4E:
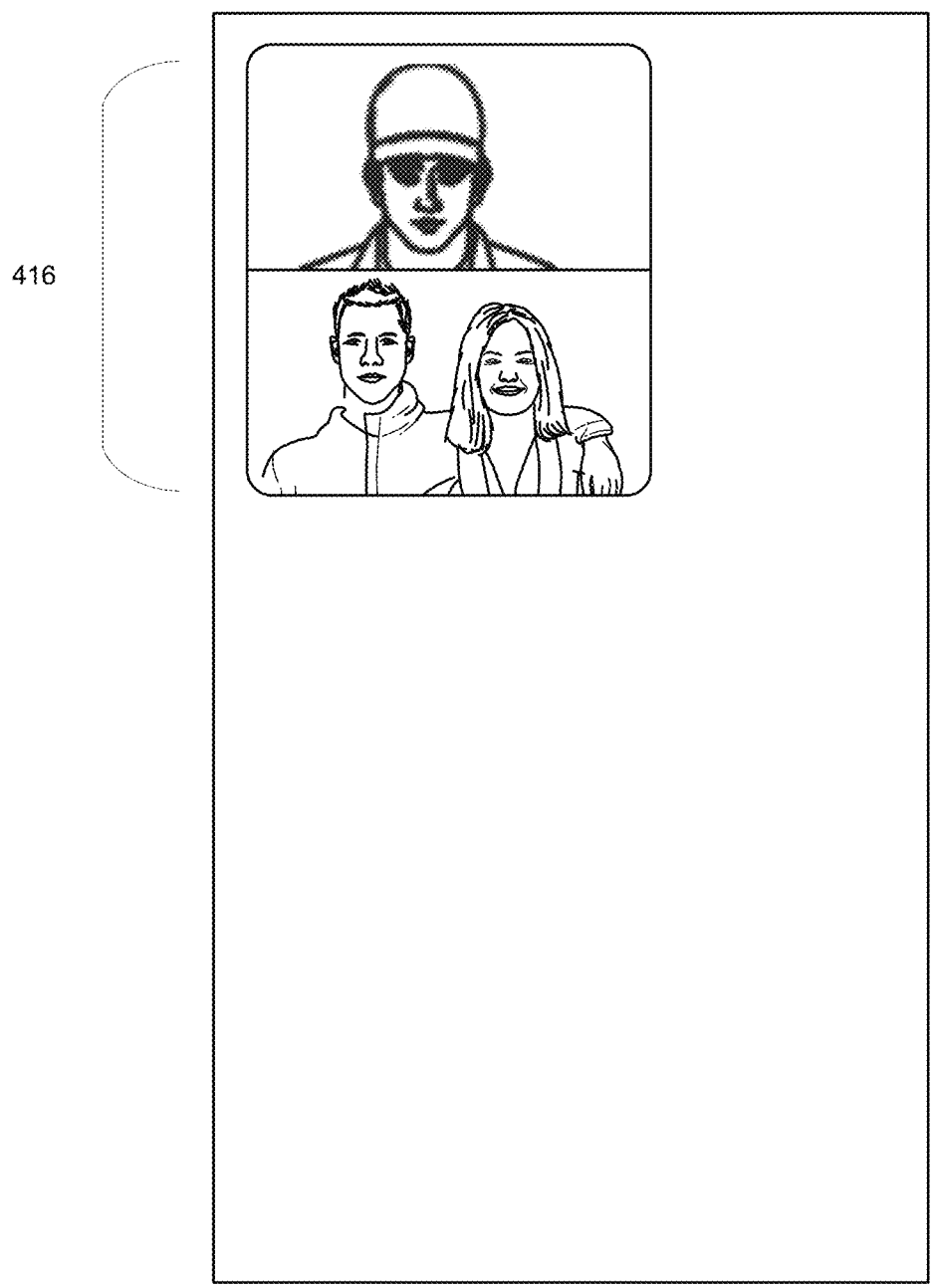
Figure 4F:
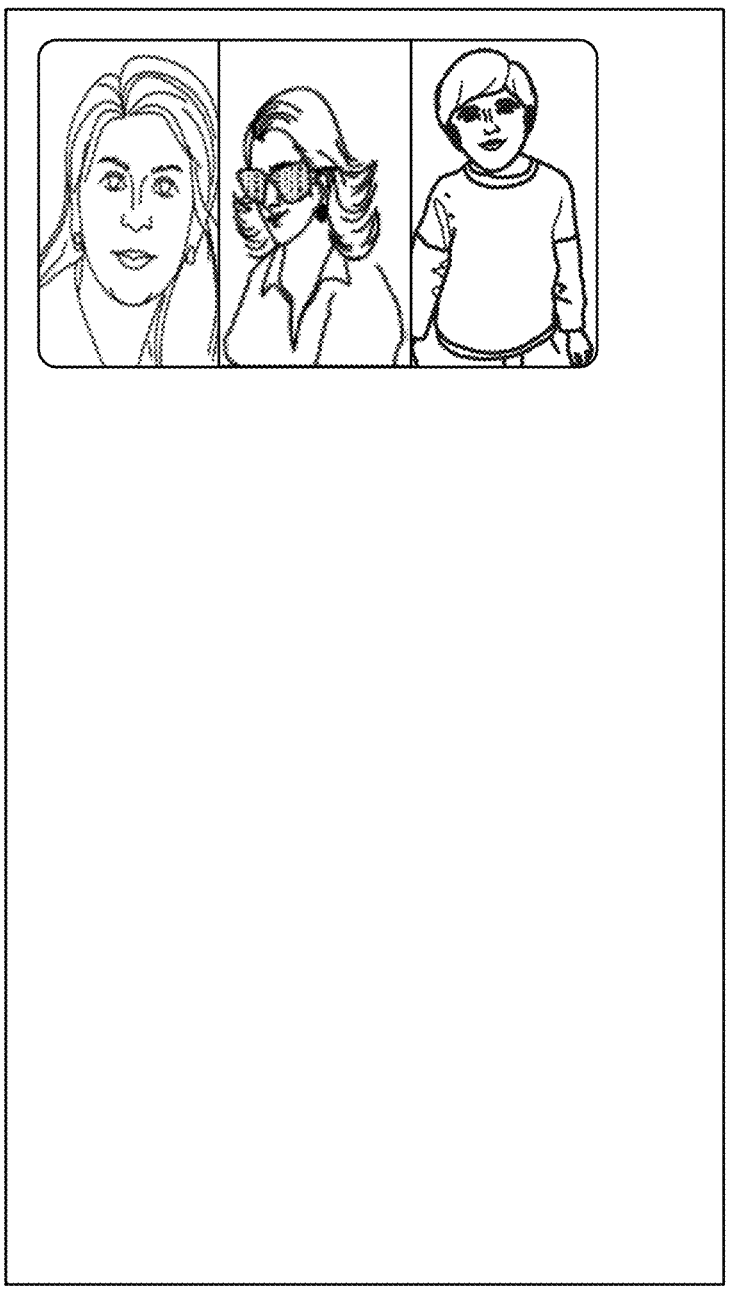
Figure 4G:
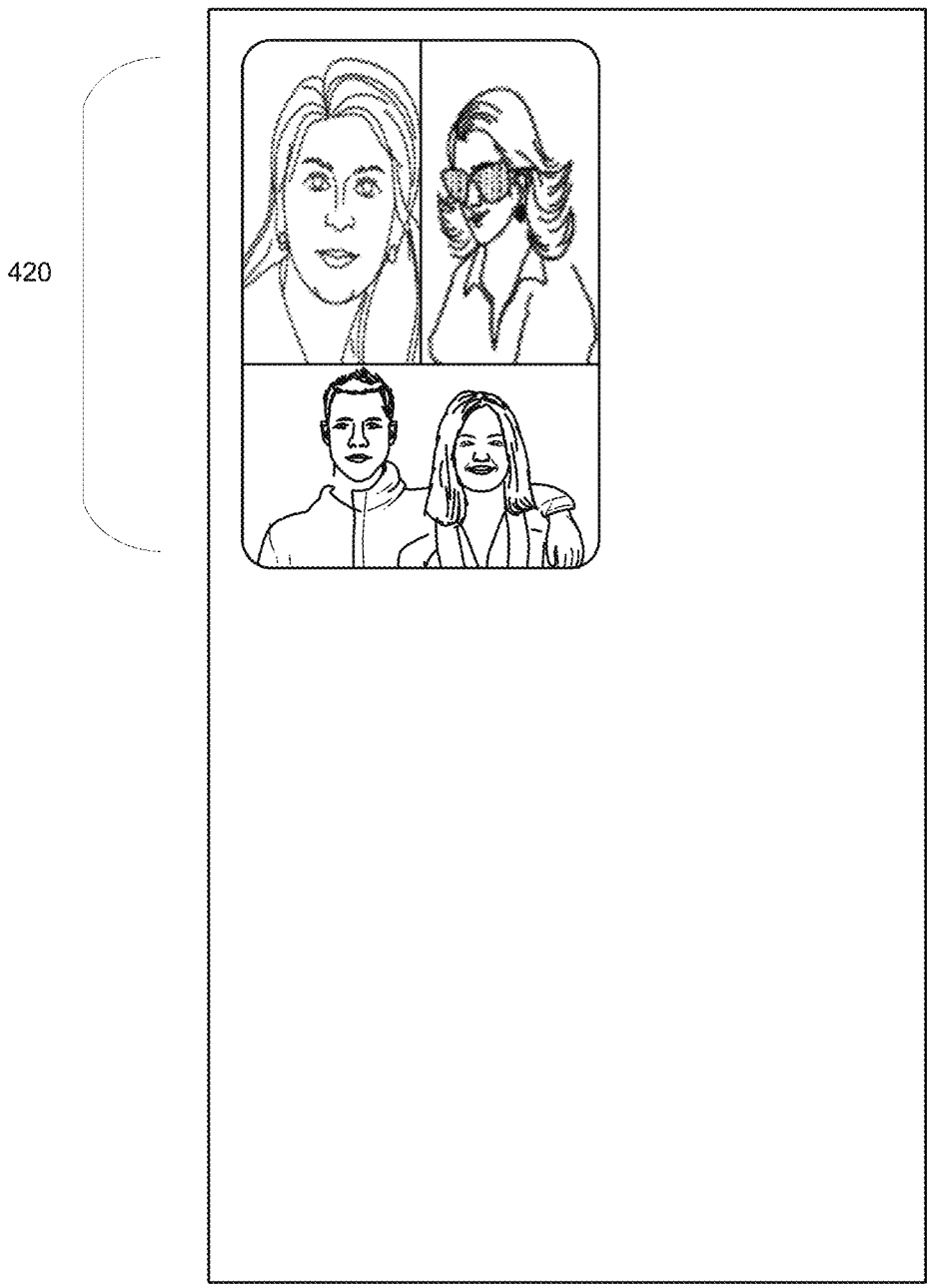
Figure 4H:
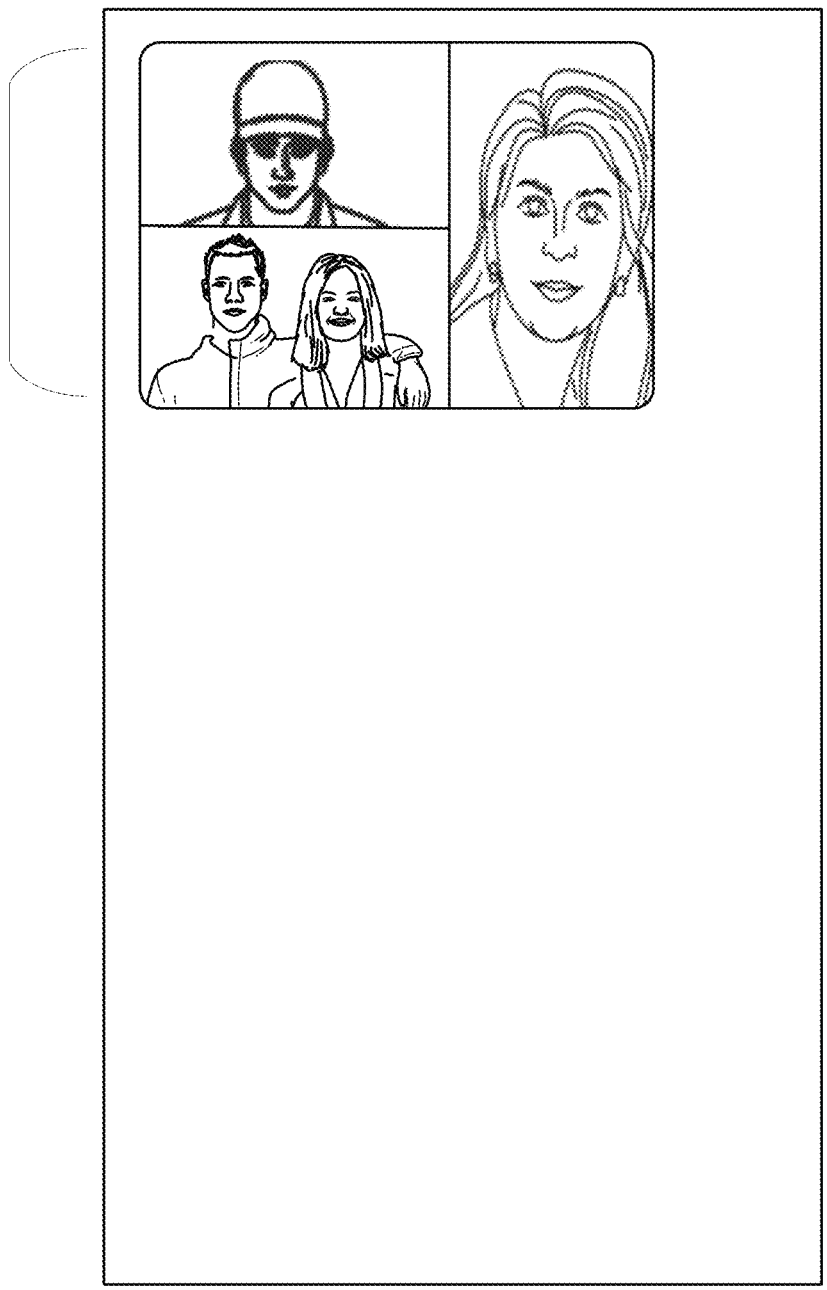
Figure 4I:
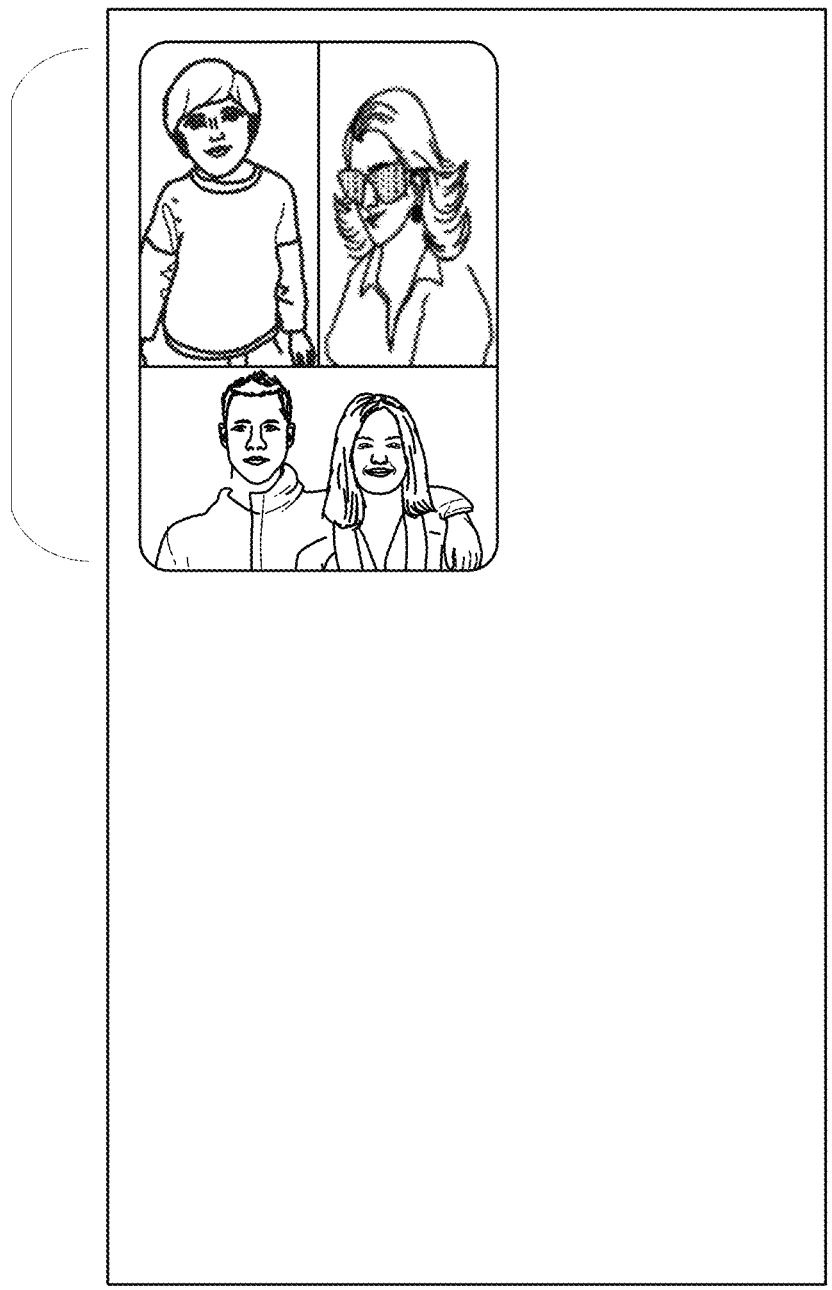
Figure 4J:
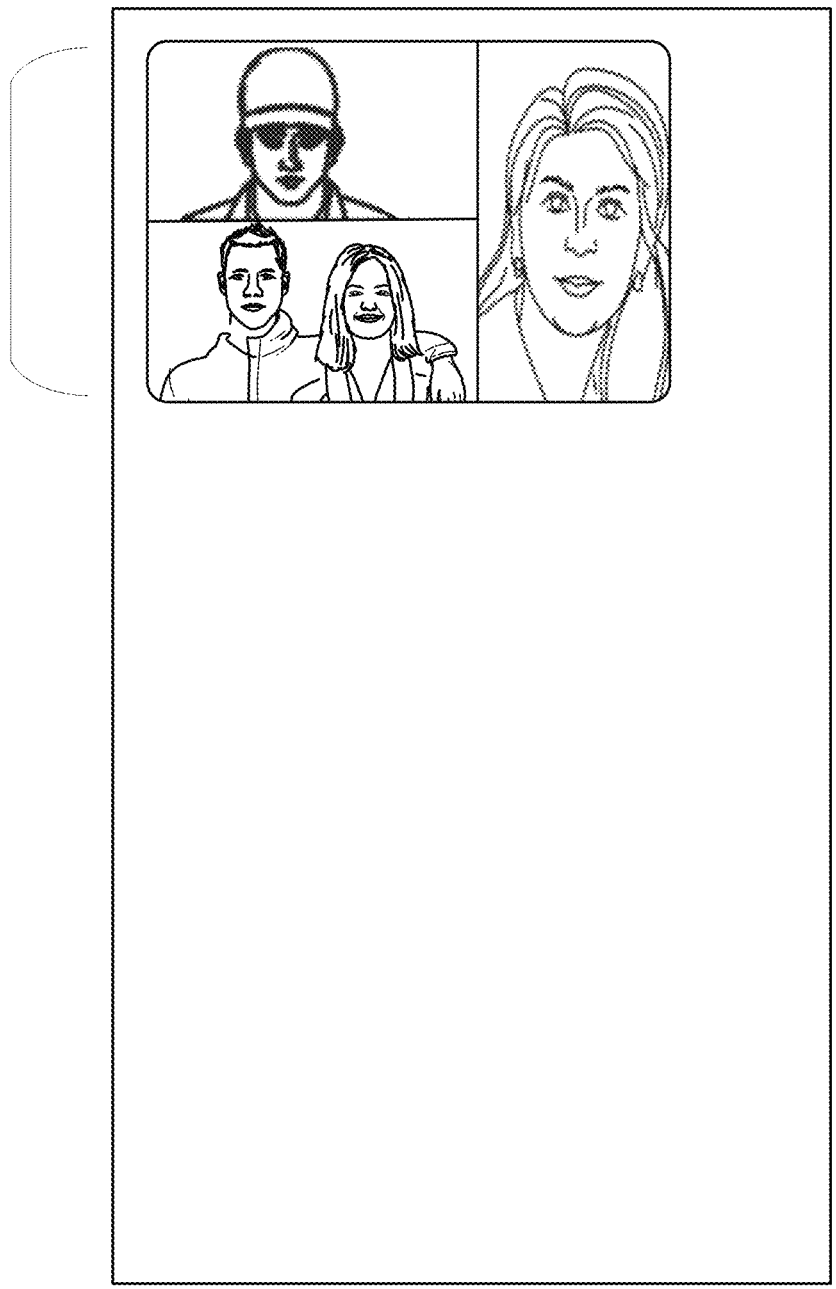
Figure 4K:
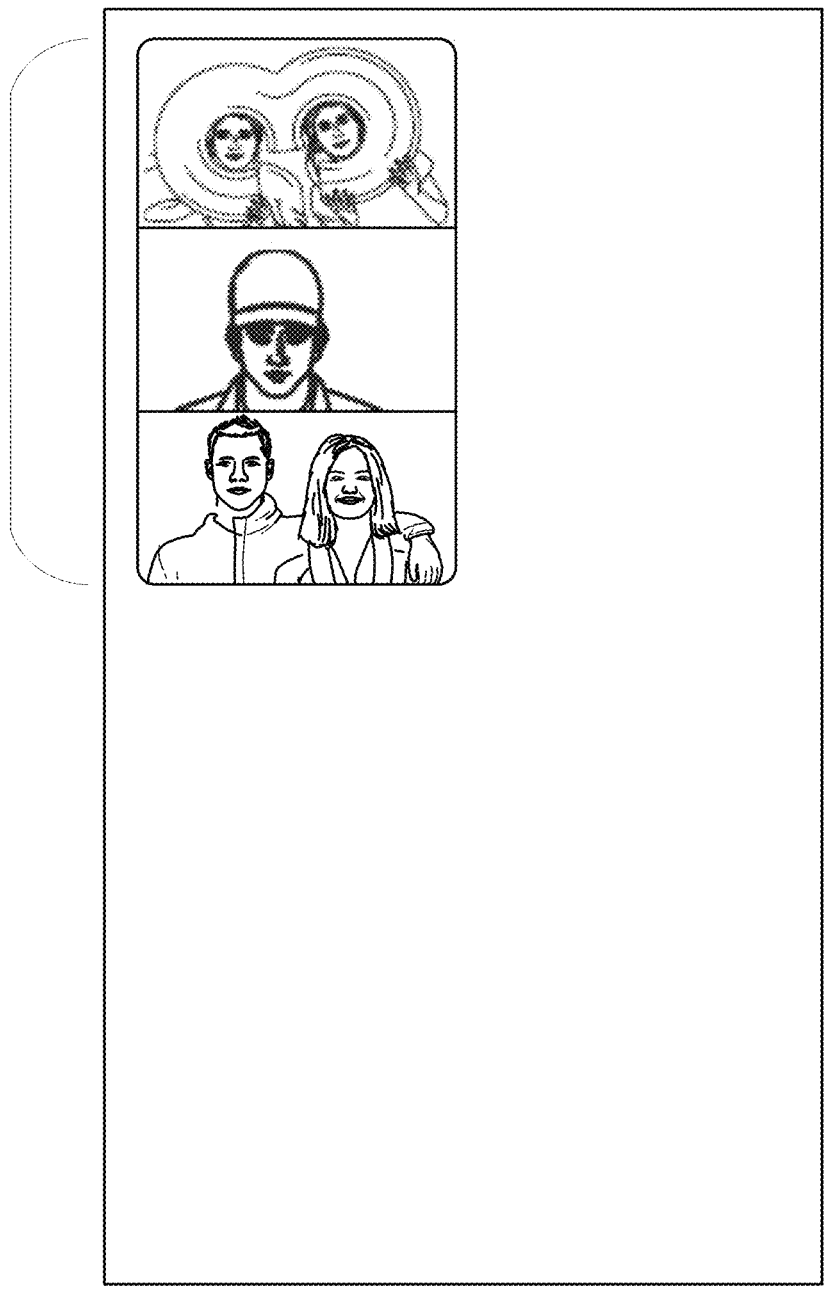

FIG. 4A illustrates example videos 402a, 402b, 402c, 402d, 402e, 402f of users participating in video calls, according to an embodiment of the present technology. The videos 402a, 402b, 402c, 402d, 402e, 402f are individual video streams of users that can be included in different grids of videos representing different video calls. As shown, the videos 402a, 402b, 402c, 402d, 402e, 402f capture the users in different views (e.g., portrait view, landscape view) based on the orientation of a computing device that is capturing the videos.

FIGS. 4B-4K illustrate example layouts of grids of videos representing various video calls, according to an embodiment of the present technology. The videos included in the layouts of grids are the videos shown in FIG. 4A. The layouts of grids of videos are shown in a picture-in-picture mode. In some embodiments, the layouts of the grids of videos can be generated by the video call grid module 202.

FIGS. 4B-4E illustrate various layouts of grids 410, 412, 414, 416 reflecting different combinations of videos when a selected number of users to be included in a grid has a value of two. Grid 410 is a combination of a video in portrait view and a video in landscape view; grid 412 is a combination of a video in portrait view and a video in portrait view; grid 414 is a combination of a video in portrait view and a video in landscape view; and, grid 416 is a combination of a video in landscape view and a video in landscape view. The size of a video in a grid can be varied based on different considerations. In some cases, a self video (or "selfie") in a grid can be generated to be smaller than other videos in the grid. For example, the size of the video in landscape view in grid 410 can be generated to be relatively smaller when the video in landscape view depicts the user(s) to which the grid 410 is being shown (i.e., when the video in landscape view is a self video). As another example, the size of the video in portrait view in grid 414 can be generated to be relatively smaller when the video in portrait view depicts the user to which the grid 414 is being shown (i.e., when the video in portrait view is a self video). FIGS. 4F-4K illustrate various layouts of grids 418, 420, 422, 424, 426, 428 reflecting different combinations of videos when a selected number of users to be included in a grid has a value of three. Grid 418 is a combination of a video in portrait view, a video in portrait view, and a video in portrait view; grid 420 is a combination of a video in portrait view, a video in portrait view, and a video in landscape view; grid 422 is a combination of a video in landscape view, a video in landscape view, and a video in portrait view; grid 424 is a combination of a video in portrait view, a video in portrait view, and a video in landscape view; grid 426 is a combination of a video in landscape view, a video in landscape view, and a video in portrait view; and, grid 428 is a combination of a video in landscape view, a video in landscape view, and a video in landscape view. As shown, the aspect ratios of the grids 410, 412, 414, 416, 418, 420, 422, 424, 426, 428 are variable (i.e., non-fixed). As shown, the generation of the grids can result in different aspect ratios to accommodate various combinations of different orientations of videos and to avoid cropping of individual videos. In other examples (not shown), a selected number of videos to be included in grids of videos can be yet a different value and accordingly the layouts generated for the grids and associated aspect ratios can vary according to the different value and orientations of the individual videos to be included. Many variations are possible.

Figure 5:
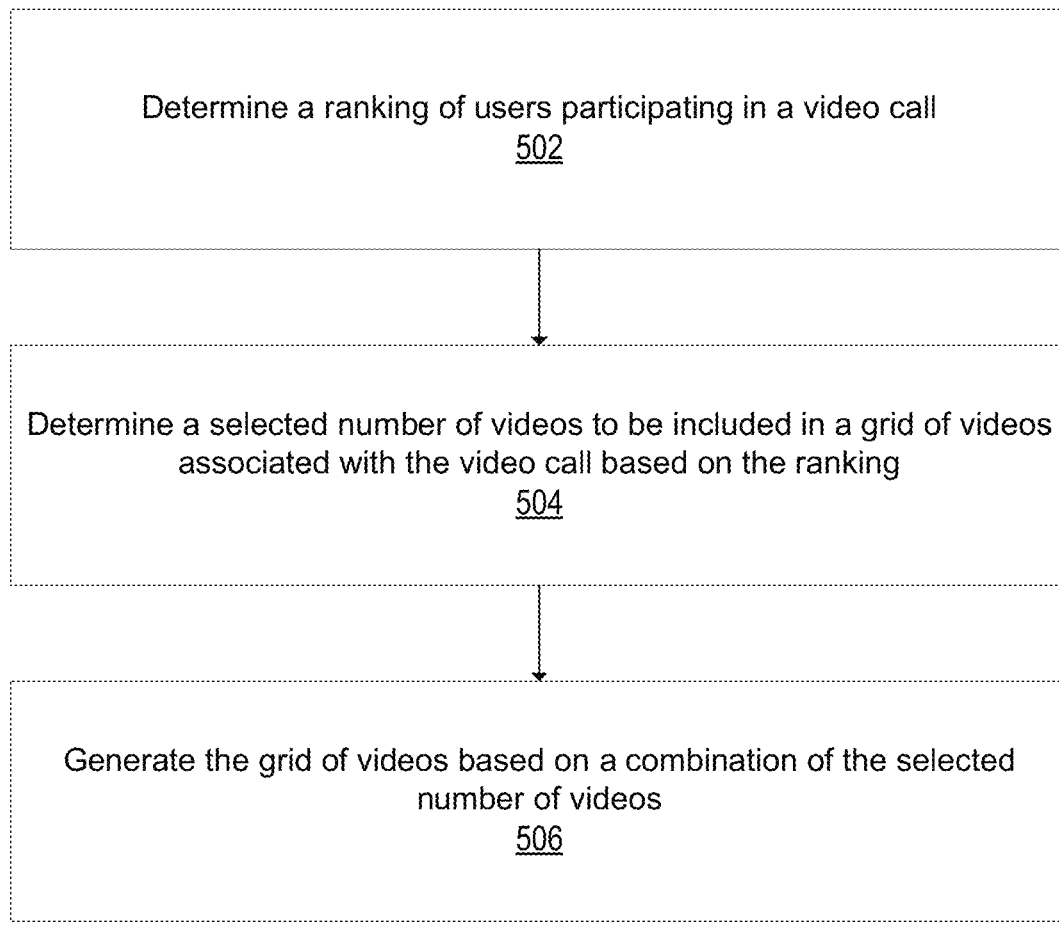
FIG. 5 illustrates an example method, according to an embodiment of the present technology.

FIG. 5 illustrates an example method 500, according to an embodiment of the present technology. It should be understood that there can be additional, fewer, or alternative steps performed in similar or alternative orders, or in parallel, based on the various features and embodiments discussed herein unless otherwise stated. At block 502, the method 500 can determine a ranking of users participating in a video call. At block 504, the method 500 can determine a selected number of videos to be included in a grid of videos associated with the video call based on the ranking. At block 506, the method 500 can generate the grid of videos based on a combination of the selected number of videos.

It is contemplated that there can be many other uses, applications, and/or variations associated with the various embodiments of the present technology. For example, in some cases, a user can choose whether or not to opt-in to utilize the present technology. The present technology can also ensure that various privacy settings and preferences are maintained and can prevent private information from being divulged. In another example, various embodiments of the present technology can learn, improve, and/or be refined over time.

Social Networking System—Example Implementation

Figure 6:
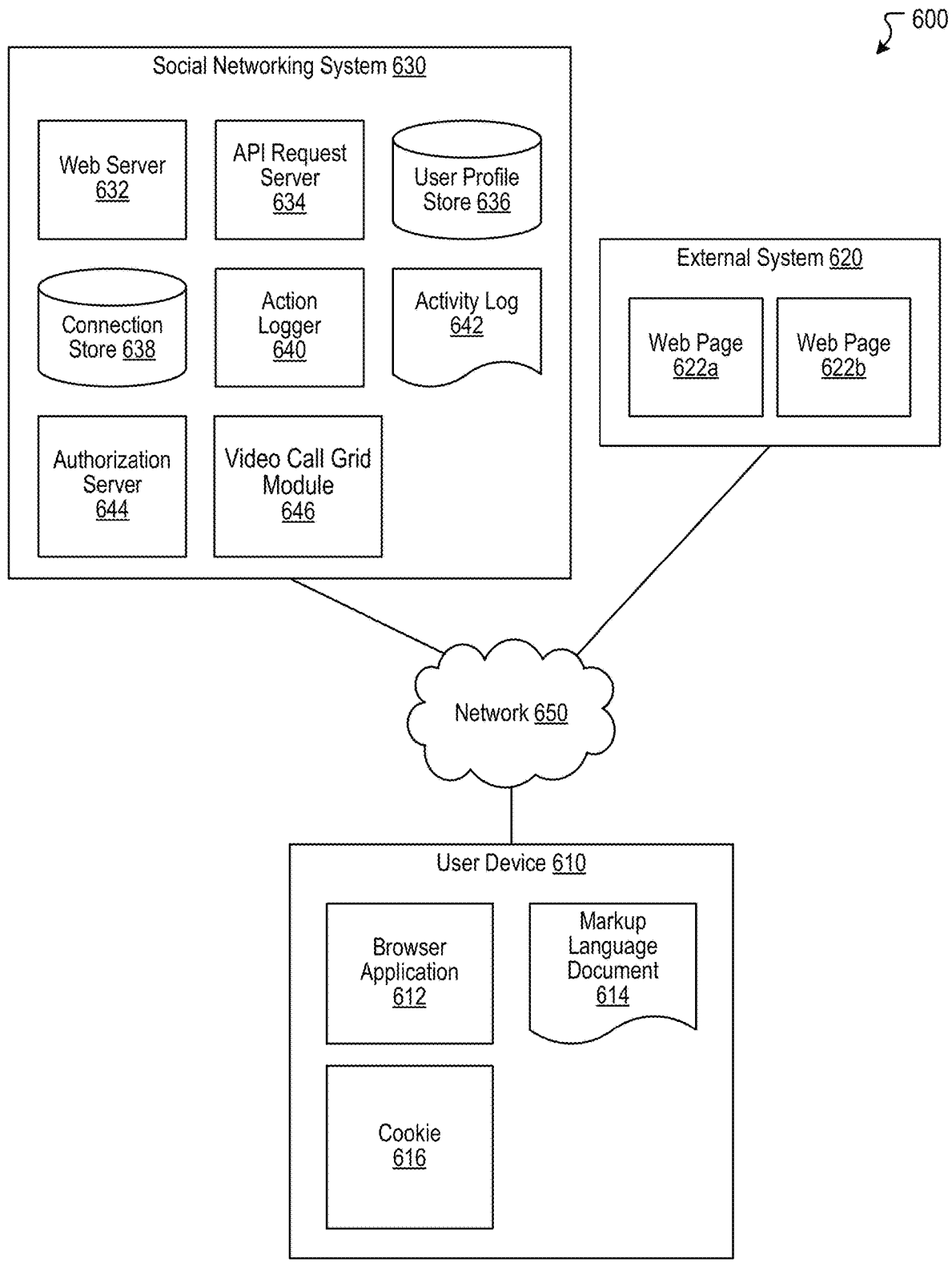
FIG. 6 illustrates a network diagram of an example system including an example social networking system, according to an embodiment of the present technology.

FIG. 6 illustrates a network diagram of an example system 600 that can be utilized in various scenarios, according to an embodiment of the present technology. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual", but connections may also be unilateral, or "one-way". For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes"

another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622*a* within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a video call grid module 646. The video call grid module 646 can be implemented with the video call grid module 202, as discussed in more detail herein. In various embodiments, some or all functionality of the video call grid module 202 can be additionally or alternatively implemented by the user device 610. It should be appreciated that there can be many variations or other possibilities.

Hardware Implementation

Figure 7:
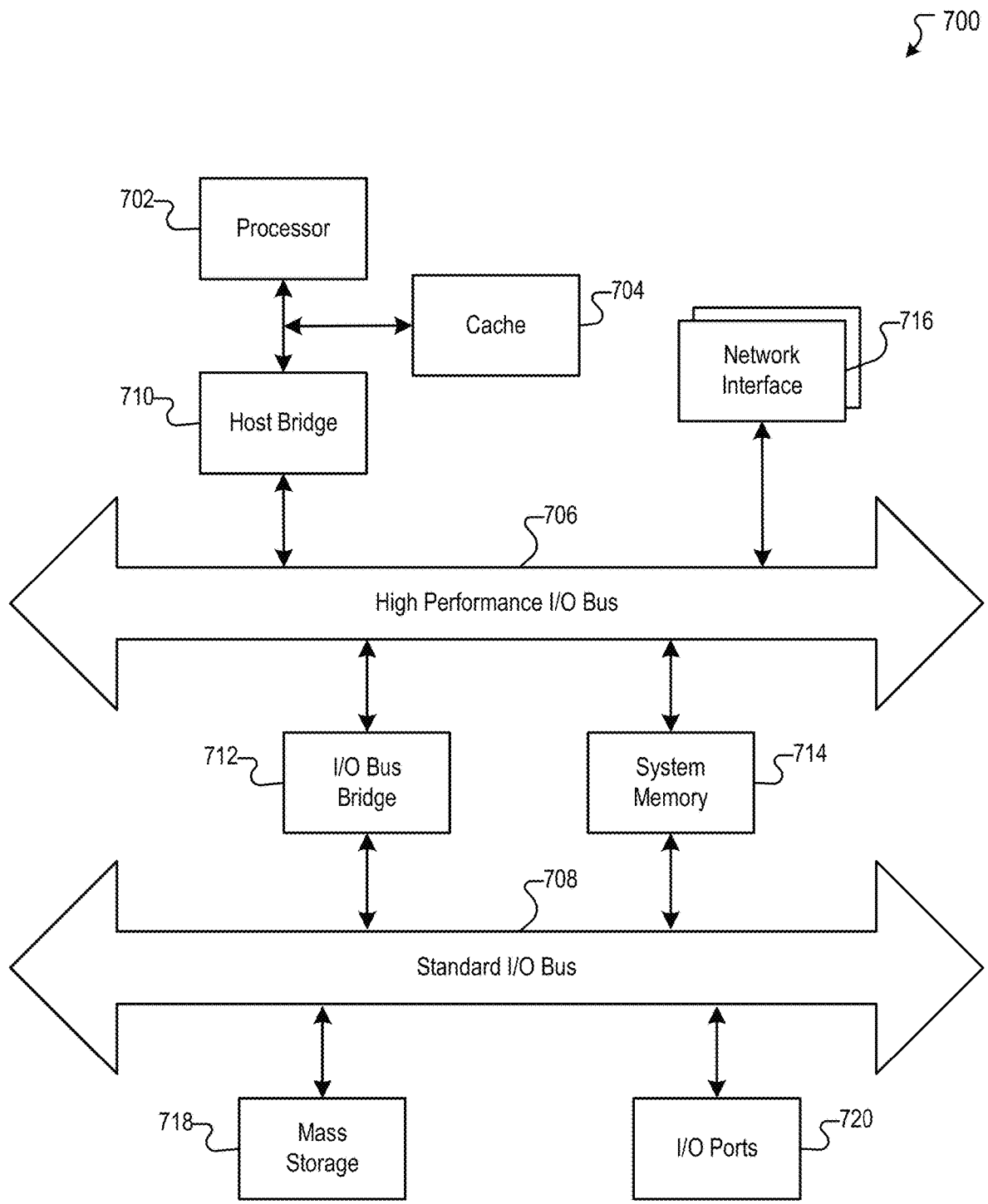
FIG. 7 illustrates an example of a computer system or computing device that can be utilized in various scenarios, according to an embodiment of the present technology.

The foregoing processes and features can be implemented by a wide variety of machine and computer system architectures and in a wide variety of network and computing environments. FIG. 7 illustrates an example of a computer system 700 that may be used to implement one or more of the embodiments described herein according to an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 620, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and V/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, California, and the x86-compatible processors manufactured by Advanced Micro Devices (AMD), Inc., of Sunnyvale, California, as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the technology can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the present technology. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   determining, by a computing system, a ranking of users participating in a video call;
   determining, by the computing system, a selected number of videos to be included in a grid of videos associated with the video call based on a set of criteria including at least a number of the users participating in the video call;
   determining a selected number of highest ranking users by applying the selected number of videos to the ranking; and
   generating, by the computing system, the grid of videos based on a combination of the selected number of videos including the highest ranking users.

2. The computer-implemented method of claim 1, wherein the grid of videos is rendered in a picture-in-picture mode through a screen of a computing device of a user participating in the video call.

3. The computer-implemented method of claim 1, wherein an aspect ratio of the grid of videos is variable during the video call based on orientations of the selected number of videos.

4. The computer-implemented method of claim 1, wherein the grid of videos associated with the video call has a first aspect ratio and a grid of videos associated with a second video call has a second aspect ratio.

5. The computer-implemented method of claim 1, wherein each video of the selected number of videos is not cropped in the grid of videos.

6. The computer-implemented method of claim 1, wherein the ranking of users is based on a prioritization of configuration information associated with the users.

7. The computer-implemented method of claim 6, wherein the configuration information comprises at least one of: selection by a user of a setting to display a video of the user in the grid or a predetermined action taken by a user during the video call.

8. The computer-implemented method of claim 7, wherein the predetermined action comprises at least one of: screen sharing or speaking.

9. The computer-implemented method of claim 1, wherein the selected number is based on at least one of: resource expenditures, size of a user depicted in a video in the grid of videos, awareness of a user about itself, or awareness of a user about the users participating in the video call.

10. The computer-implemented method of claim 1, wherein the grid of videos contains a number of videos that is less than the selected number of videos when resource availability satisfies a threshold value.

11. A system comprising:
    at least one processor; and
    a memory storing instructions that, when executed by the at least one processor, cause the system to perform operations comprising:
    determining a ranking of users participating in a video call;
    determining a selected number of videos to be included in a grid of videos associated with the video call based on a set of criteria including at least a number of the users participating in the video call;
    determining the selected number of highest ranking users by applying the selected number of videos to the ranking; and
    generating the grid of videos based on a combination of the selected number of videos including the highest ranking users.

12. The system of claim 11, wherein the grid of videos is rendered in a picture-in-picture mode through a screen of a computing device of a user participating in the video call.

13. The system of claim 11, wherein an aspect ratio of the grid of videos is variable during the video call based on orientations of the selected number of videos.

14. The system of claim 11, wherein the grid of videos associated with the video call has a first aspect ratio and a grid of videos associated with a second video call has a second aspect ratio.

15. The system of claim 11, wherein each video of the selected number of videos is not cropped in the grid of videos.

16. A non-transitory computer-readable storage medium including instructions that, when executed by at least one processor of a computing system, cause the computing system to perform operations comprising:
- determining a ranking of users participating in a video call;
- determining a selected number of videos to be included in a grid of videos associated with the video call based on a set of criteria including at least a number of the users participating in the video call;
- determining the selected number of highest ranking users by applying the selected number of videos to the ranking; and
- generating the grid of videos based on a combination of the selected number of videos including the highest ranking users.

17. The non-transitory computer-readable storage medium of claim 16, wherein the grid of videos is rendered in a picture-in-picture mode through a screen of a computing device of a user participating in the video call.

18. The non-transitory computer-readable storage medium of claim 16, wherein an aspect ratio of the grid of videos is variable during the video call based on orientations of the selected number of videos.

19. The non-transitory computer-readable storage medium of claim 16, wherein the grid of videos associated with the video call has a first aspect ratio and a grid of videos associated with a second video call has a second aspect ratio.

20. The non-transitory computer-readable storage medium of claim 16,
- wherein each video of the selected number of videos is not cropped in the grid of videos.

\* \* \* \* \*